United States Patent Office 2,907,745
Patented Oct. 6, 1959

2,907,745

POLYURETHANE OF A POLYISOCYANATE, AN ACTIVE HYDROGEN COMPOUND, AND A HYDROXYARYL ALIPHATIC ACID

Sylvan O. Greenlee, Racine, Wis., assignor to S. C. Johnson & Son, Inc., Racine, Wis.

No Drawing. Application January 16, 1957
Serial No. 634,411

7 Claims. (Cl. 260—47)

This invention relates to novel resinous compositions of matter of the polyurethane type and is directed more particularly to synthetic resinous compositions derived from the reaction of hydroxyaryl aliphatic acids with polyisocyanates in presence of an organic compound capable of entering into the reaction and exerting an influence upon the nature of the resulting product.

It is known a urethane resin may be obtained by reacting a polyisocyanate or polyisothiocyanate with a group of compounds characterized by one or more of what has been termed "an active hydrogen group." Foremost among the "active hydrogen" compounds, at least as regards commercial development, have been the polyester compounds, although polyhydroxy-, polyamino-, polyamido- and polythio-compounds are also recognized as being more or less useful in this connection. The resinous products derived from this reaction are dependent for their characteristics, for the most part, upon the structure of the active hydrogen compound with the isocyanate acting principally as a physical coupling agent between residues of the polyester or other compound. The range or variety of properties has thus been limited by the types of structures possessed by available active hydrogen compounds, and the formulator has often found it quite difficult to develop products having the desired characteristics.

The primary object of the present invention is the incorporation in a polyurethane-forming mixture of a compound having multiple functionality both with respect to isocyanates and isothiocyanates and active hydrogen compounds, by means of which compound a broad spectrum of polymers of this type can be obtained.

Another of the objects of this invention is to provide a new class of synthetic resinous compositions which are capable of further reaction to give infusible, insoluble materials suitable for use as protective coatings, adhesives, and molding resins having a variety of properties.

A further object is the synthesis along the general lines of established urethane reactions of a film-forming product characterized, by virtue of the novel reactants from which it is derived, with improved properties especially as regards resistance to attach by chemicals, resistance to wear, and resistance to penetration and solvent action by water.

By suitable adjustment of the conditions of the reaction and the ingredients, the product of the invention may be caused to assume a cellular or foam state, and, accordingly, an additional aim of the invention is the provision of lightweight three-dimensional solids possessing good structural strength and, therefore, useful in load-bearing applications.

These and other objects are accomplished by the present invention which contemplates the reaction of a substantial amount of an isocyanate or isothiocyanate, at least half of which must contain two or more isocyanate or isothiocyanate groups per molecule, with an aliphatic acid, having a total of at least five carbon atoms with a single carbon atom being substituted with two hydroxyaryl groups, and an organic compound having an active hydrogen groups at least two of the following radicals: $YH$, $CYYH$, $NH_2$, and $CYNH_2$, where $Y$ is oxygen or sulfur, which compound is free of other reactive groups.

It has been found that the addition of hydroxyaryl aliphatic acids to a polyisocyanate-active hydrogen compound reaction mixture is an unusually advantageous measure for obtaining polymeric resinous compositions characterized by excellent protective coating and adhesive properties when used as a film, and high structural strength when cast into foam resin bodies. The hydroxyaryl aliphatic acids are especially adapted for the reaction by virtue not only of the presence in each molecule thereof of a plurality of functional groups reactive with both the isocyanates and active hydrogen compounds, but because of the novel combination of hydroxyl and carboxyl radicals that make up this plurality of groups. As will be explained more fully, both hydroxyl and carboxyl radicals condense with an isocyanate group and, thus, are of value in forming a resinous product; in addition, the carboxyl radical during the course of the condensation decomposes to liberate carbon dioxide which can be made use of in producing foam resin structures. Hydroxyaryl aliphatic acids are high melting, cyclic compositions of unique symmetrical structure and tend to contribute to the reaction product such properties as outstanding chemical resistance and superior hardness and toughness. Chemical resistance is, for example, of great value in the formulation of protective coatings which are likely to be subjected in the course of ordinary usage to contact with various chemicals. The presence in the resin of residues having a symmetrical structure results in a more rigid product, a feature of much advantage in polyurethane foams.

The hydroxyaryl aliphatic acids contemplated for reaction according to this invention may be, and preferably are, prepared by condensing a phenolic compound with a keto-acid under such conditions that two hydroxyaryl radicals are attached to the same carbon atom of the acid. In order for the yields of this reaction to achieve useful levels, it is necessary, first, that the keto-carbon atom occur at the position adjacent a terminal methyl group, and, second, that the keto-acid has at least five carbons in the aliphatic chain. The keto-acid of this type which has only four carbon atoms, aceto-acetic acid, is highly unstable under the conditions necessary for the reaction and is unsatisfactory. The five-carbon acid, levulinic acid, gives excellent yields. Higher acids are apparently useful, but these exist principally as laboratory curiosities and are not available in commercial quantities. There is disclosed in prior co-pending applications, Serial Nos. 464,607 and 489,300, filed October 25, 1954, and February 18, 1955, respectively, a number of illustrative acids that have been found to be particularly suitable for use, as well as methods of preparing the same. These acids consist of the condensation products of levulinic acid and phenol, substituted phenols, or mixtures of phenol and substituted phenols and shall, for the sake of brevity, be referred to herein as "the Diphenolic Acid."

The term "substituted phenols" is used herein to embrace phenols and phenolic compounds wherein one or more hydrogen atoms of the phenyl nucleus is replaced by an atom or group that does not enter into, or otherwise interfere with, the condensation of the compound with the keto-acid. Thus, for example, the nucleus may be alkylated with a methyl or other alkyl group, preferably having not more than five carbon atoms, as disclosed in the aforementioned application, Serial No. 489,300, or halogenated with bromine, fluorine, chlorine, or combinations thereof, provided that a total number of substituents, including hydroxyl groups does not exceed three. The Diphenolic Acid derived from substituted phenols, such as the alkylated phenols, is sometimes more desirable than the products obtained from unsubstituted phenols since the alkyl groups tend to provide better organic solvent solubility, flexibility, and water-resistance, as well as influencing the nature and extent of subsequent reactions for which the acids are adapted. However, the unsubstituted product is usually more readily purified.

The second component necessary for the reaction of the present invention is an isocyanate or isothiocyanate compound. In order that a resinous product be obtained, the isocyanate or isothiocyanate compound must contain two or more isocyanate or isothiocyanate groups, a plurality of functions being essential if a chain or cross-linked structure is to be developed by condensation with the functional groups of the Diphenolic Acid and/or the active hydrogen compound. Accordingly, the isocyanate may be defined as a compound having the general formula $R(NCX)_z$, where X is a chalcogen having an atomic weight less than 33, i.e., oxygen or sulfur; $z$ is an integer of more than one; and R is a polyvalent organic radical with the number of valences being equal to $z$. There are numerous compounds coming within this formula that are suitable for the reaction and no attempt will be made to give an exhaustive list. The following are considered illustrative and will suggest to the expert a variety of others: alkylene diisocyanates; such as ethylene diisocyanate, trimethylene diisocyanate, tetramethylene diisocyanate, hexamethylene diisocyanate, decamethylene diisocyanate, and their corresponding sulfur analogues; cyclo-alkylene diisocyanate, such as cyclopentylene diisocyanate, cyclohexylene diisocyanate, and their corresponding sulfur analogues; aromatic diisocyanates, such as m-phenylene diisocyanate, naphthalene diisocyanate, diphenyl-4,4'-diisocyanate, and their corresponding sulfur analogues; aliphatic-aromatic diisocyanates, such as xylene-1,4-diisocyanate, diphenylene methane diisocyanate and their corresponding sulfur analogues; hetero-diiso- and diisothiocyanates, such as

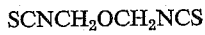

$$SCNCH_2OCH_2NCS$$

and $SCNCH_2SCH_2NCS$; and isocyanates and isothiocyanates having more than two isocyanate or isothiocyanate groups, such as benzene 1,2,4-triisocyanate, 1,2,2-triisocyanatobutane, and toluene triisocyanate. From among these and other polyisocyanates and polyisothiocyanates, the following are preferred largely by reason of their ready commercial availability; toluene 2,4-diisocyanate, toluene 2,6-diisocyanate, methylene bis(4-phenyl isocyanate), 3,3' bitolylene 4,4' diisocyanate, and hexamethylene diisocyanate. In order to simplify the remainder of the discussion, the repetitious recital of both the oxygen and sulfur forms will be dispensed with; only the oxygen compound will be given but will be understood as embracing the corresponding sulfur analogue.

While, as has already been mentioned, urethane reaction requires a polyisocyanate compound, it is desirable for certain applications to alter the product by using, in addition, a minor portion of a monoisocyanate. Many of the reaction products of Diphenolic Acid with polyisocyanates tend to be brittle infusible products; on the other hand, this tendency may be counteracted by the addition to the reaction mixture of a proper amount and type of monoisocyanate, particularly when combined with the proper amount and type of active hydrogen compound. Examples of suitable monoisocyanates are octadecylisocyanate, hexyl isocyanate, and decylisocyanate, to mention just a few of the simpler compounds. Long-chain monoisocyanates, i.e. having more than 11 carbon atoms, are more effective as regards flexibility. Unsaturated compounds can also be utilized and provide an additional curing or converting aid. The amount of the mono-compound that is added to the reaction mixture will vary depending upon the characteristics desired in the product. As a general rule, there should be present a greater amount of the poly-compound that the mono-compound, which is to say, that the monoisocyanate should be less than 50% of the total of all isocyanates in the reaction mixture. If a more rigid, brittle material is sought, the quantity of the mono-form should be decreased, while, if more flexibility is the desideratum, it should be increased toward the upper limit just mentioned. The functional group of the mono-form may react with the carboxyl or phenolic hydroxyl groups of the acid to reduce cross-linking within the polymer chain and thereby enhance the softness and pliability of the polymer in proportion to the amount present, or a functional group of each of two molecules of the monoisocyanate may react with two of the functional groups of a single molecule of acid and, thus, terminate the chain. Reaction of the mono-compound and the active hydrogen compound is also a possibility, which reaction may also end the growth of the polymer molecule or reduce cross-linking.

The active hydrogen compound is the final component of the reaction mixture described herein. For the purpose of the invention, the active hydrogen compound must include at least two of the radicals —OH, —COOH, —CONH₂, —NH₂ —SH, —COSH, —CSNH₂. To simplify the discussion, compounds meeting this requirement have been grouped into the following classes: (A) the polyhydroxy compounds, (B) the polybasic acids, (C) the polyamines and polyamides, (D) miscellaneous analogous sulfur compounds, and (E) the polyester resins. As will be seen later, compounds containing more than one type of radical, i.e., "hybrid" compounds, have not been classified independently but are included in these five groups. In this case, as a rule, the compound is classified in that group of the several into which it might fall by virtue of the radicals it contains, which has the highest numerical designation in accordance with the above break-down. For example, a compound containing both hydroxy and amine radicals appears with the sulfur compounds, and a compound having recurring ester linkages and free carboxyl radicals appears with the polyesters.

The first of these classes are the polyhydroxy compounds, which, as contemplated herein, embraces the aliphatic, alicyclic, heterocyclic, and aromatic compounds containing at least two hydroxy radicals. Examples of these compounds are the alkylene glycols, such as ethylene glycol; polyalkylene glycols, such as diethylene glycol and the "Carbowax" series manufactured and sold by the Carbide and Carbon Chemical Company; glycerol, erythritols, higher alcohols, such as mannitol and sorbitol; aromatic alcohols, such as resorcinol, hydroquinone, and bis-phenol; and resinous alcohols, such as the epoxides. Mixtures of the Diphenolic Acid with dihydric phenols, particularly the alkylidene diphenols, in reaction with the isocyanates give rigid, infusible products possessing excellent chemical resistance to alkali and water when formed as films and outstanding rigidity when cast as foam resin structures. It is well known that the polyhydric alcohols, such as the long-chain glycols, given on reaction with the isocyanates soft flexible-type compositions of relatively low chemical resistance. Modification of these compositions with Diphenolic Acid has been found to greatly increase the chemical resistance of protective coating films prepared therefrom as well as to strikingly heighten the rigidity of foam resin structures produced therefrom.

Next in the classification are the polybasic acids. Examples of these acids are the saturated aliphatic-polycarboxylic acids such as adipic and tricarboxylic acid, azelaic acid; unsaturated aliphatic-polycarboxylic acids, such as fumaric acid and aconitic acid, and aromatic polybasic acids, such as the isomers of benzene dicarboxylic acid. Polyfunctional acids are of particular interest in connection with the formation of resin foams as the carboxyl group decomposes upon reaction with an isocyanate to release carbon dioxide. With the addition of a Diphenolic Acid, further carbon dioxide is available from the carboxyl group of the Diphenolic Acid and enhanced foaming results. This is advantageous since enhanced foaming was usually previously obtained by adding substantial amounts of water. As is well known, water reacts with an isocyanate to yield carbon dioxide and a carbamide. Consequently, extensive foaming by the prior art method required an excess of isocyanate, a relatively expensive material, adding on a weight basis to the cost of the product and the reaction was difficult to control. In addition, the Diphenolic Acid serves to strengthen the rigidity of the foam and causes the cell arrangement to be disconnected or closed rather than open. Where the combination of isocyanate, polybasic acid and Diphenolic Acid is used as a film or coating, the Diphenolic Acid tends to balance the essentially soft influence of the polybasic acid, permitting the formulation of tougher, harder films than would otherwise be the case. One interesting property of the polybasic acids in this association is their tendency to improve the characteristics of the film in the presence of water, presumably due to the hydrophilic character of such acids. Films which are highly hydrophobic are whitened by prolonged contact with water. By adding material having hydrophilic properties to the film-forming mixture, the hydrophobic character of the film can be reduced to a level at which whitening does not occur without undue loss of overall resistance to water.

The third class, the polyamines and polyamides, is characterized by the presence of an $—NH_2$ radical, which in the case of the polyamides is combined with a carbonyl group as the radical $—CONH_2$. Examples of this class are the alkylene and polyalkylene diamines, such as ethylene diamine and hexamethylene diamine; heterocyclic polyamines, such as diethylene diamine; and aromatic polyamines, such as phenylene diamine; the aliphatic diamides, such as malonamide, succinamide and adipamide; aromatic diamides, such as phthaldiamide; and the resinous polyamides. Compounds containing amino groups are of particular value in accelerating the reaction. It is interesting to observe that polyamines are slightly more inclined to impart flexibility to products than the polyamides. Thus, a product of balanced flexibility-rigidity, or increased rigidity, may be obtained by the addition of a Diphenolic Acid. The poly-nitrogen compounds are also useful where products having high chemical and water resistance are sought.

Another class of active hydrogen compounds is the sulfur-containing chemicals. As a general rule, this class embraces the corresponding sulfur analogues of the members of the other classes. Thus, polythiols, such as ethanedithiol and propane-trithiol, polythioacids, polythioamides, and resinous polythio-compounds are included, among others. The most useful of these compounds are the thioresins sold under the trade name "Thiokol" and prepared by reacting an alkaline polysulfide with an organic dihalide, trihalide, or mixtures of the two. These polymers are thought to have thiol terminal groups. Preferably, the liquid polymers are employed because of their relatively low molecular weight, ease in handling, and ease in admixing with other reactants. As is well known, these materials undergo reaction with various coupling agents or can be cured with numerous curing agents to form rubbery polymers which are usually soft and flexible. When compounded with a Diphenolic Acid and an isocyanate, thioresins yield smooth, tough, flexible products having much augmented chemical resistance. Other sulfur compounds, such as the simple mercapto acids and mono- and di-mercaptans, may be used in conjunction with Diphenolic Acid in the formulation of valuable coating, adhesive, and molded objects.

Finally, there are the polyester resins, which are polymers, having recurring ester linkages and unreacted hydroxyl and carboxyl terminal groups formed by reacting a polybasic acid with a polyhydric alcohol. The nature of the reactive groups is determined by the proportion of the reactants. Thus, an excess of the alcohol favors terminal hydroxyl groups while an excess of acid favors terminal carboxyl groups. By properly balancing the amounts of each, terminal groups of both kinds can be procured. There are a number of polyester compounds available commercially, one example being a series having hydroxyl values within the range of 70–1000 and acid numbers within the range of 0–80 sold under the trade name "Multron" by the Mobay Chemical Company. Among the polybasic acids that can be used are succinic, adipic, maleic, sebacic, azelaic, fumaric, and dimerized acids, such as dimerized vegetable oil acids prepared and sold by Emery Industries, Inc. Suitable polyhydric alcohols include ethylene glycol, diethylene glycol, triethylene glycol, pentaerythritol, dipentaerythritol, tripentaerythritol, sorbitol, mannitol, glycerine, trimethanol propane and triethanol propane.

It is well known that reaction of polyester resins with the polyisocyanates results in soft flexible foam resin structures and soft coating compositions and molding materials. The use of Diphenolic Acid in conjunction with these polyesters and isocyanates has been found to be an excellent mode of promoting rigidity in foam resin structures of this type. Thus, moderately to completely stiff three-dimensional articles can be easily obtained merely by incorporation of the acid in selectively increased amounts. Variation in density of the solid product may also be effected by this means. In the field of protective coatings and adhesives, an analogous hardening and toughening influence by the Diphenolic Acid exists so that products of this kind display substantially enhanced resistance to chemical attack and deterioration as well as general wear and tear without necessarily involving undue sacrifice of the natural flexibility and clarity of the polyester resins.

The general chemistry of the present reaction is basically simple. It is well known that isocyanates react with the various chemical functional groups of the compounds employed herein and these reactions may be illustrated as follows:

(1) Hydroxyl group:
$$ROH + R'NCO \rightarrow R'NHCOOR$$
(2) Carboxyl group:
$$RCOOH + R'NCO \rightarrow R'NHCOOCOR \rightarrow R'NHCOR + CO_2$$
(3) Primary amino group:
$$RNH_2 + R'NCO \rightarrow R'NHCONHR$$
(4) Amido group:
$$RCONH_2 + R'NCO \rightarrow R'NHCONHCOR$$

The same reactions take place where sulfur is substituted for any oxygen in these reactants.

In the present invention, it is postulated that the reaction occurs within a system of three or more components, each of which is characterized by at least double functionality. Accordingly, while the union of any two groups will proceed as set forth above, it will be appreciated that the resultant product will in any case be polymeric. Further, it will be apparent that the possible arrangements that may be taken within the polymer molecule by the residues of the reactants are entirely too numerous to be presented herein. Due to the high reactivity of isocyanate groups, one would expect the condensation between these groups and the functional groups of the Diphenolic Acid to take precedence over any possible reaction between the acid and the active hydrogen compound. Thus, it can be predicted that the polymer molecule comprises Diphenolic Acid residues linked together by isocyanate residues alone or which are themselves coupled by means of the residues of the active hydrogen compound. Where the isocyanate and active hydrogen compound are difunctional, the acid residues would be separated by essentially linear chains with cross-linking taking place between the residues in adjacent chains due to the three reactive groups of the Diphenolic Acid. With isocyanates and/or active hydrogen compounds having more than two functions, cross-linking to a much greater degree would ensue.

The diversity of the isocyanates and active hydrogen compounds that can be employed makes it virtually impossible to prescribe a fixed set of rules governing the choice of a class of compounds, the particular member of that class, as well as the amounts of the member. Some of the classes and the 12 individual members are more or less equally suited for use in producing a given product so that a choice depends in many instances upon the personal preference of the formulator, such preference being based, for example, on his greater experience in working with certain types of materials than with others. As a rule, aliphathic compounds favor flexibility and softness with the extent of these properties increasing with the chain length. Conversely, compounds having a tightly knit or cyclic molecular structure favor rigidity and hardness. As a consequence, a wide range of properties can be developed by the careful selection of reactants: that is, all may promote flexibility, they all may promote rigidity, or some one and some the other in order to cover the gamut between the two extremes.

Along with the specific reactants, the properties of the product are also influenced by the amount of each reactant that is employed. Because of the high reactivity of the isocyanate, for the purpose of defining proportions it may be considered that the Diphenolic Acid and active hydrogen-containing compound react as a "unit" with the isocyanate. Within this suppositious "unit," the active compound may constitute from about 5 to about 65% of the whole, determined on the basis of equivalent weight, with the acid making up the rest. Below 5%, the effects of the active compound are rarely significant, while above 65%, the contribution of the acid is counteracted excessively or is not sufficiently great to be of real value. Experience has indicated that the Diphenolic Acid and active hydrogen compound, considered together, may be reacted in amounts, again calculated on an equivalent basis, varying from about one-fifth of the isocyanate up to about five times the isocyanate. Some products prepared from amounts outside this range may display useful characteristics attributable to all three of the reactants, but this appears to be the exception rather than the rule, and, for the most part, valuable products fall within this range. From a consideration of the reaction, it will be appreciated that the optimum situation prevails where all of the functional groups of the acid and active hydrogen compound are reacted with functional groups of the polyisocyanate. For this reason, a preferred range is 2:1 to 1:2 of acid and active compound to isocyanate on an equivalent basis with a 1:1 ratio being most desired.

If a monoisocyanate is employed along with the polyisocyanate, the number of reactive foci of the Diphenolic Acid and active hydrogen compound available to the functional groups of the polyisocyanate is lessened. In arriving at the amounts of reactants to be utilized, the mono-compound must therefore be considered, and in such case the equivalent weight of the isocyanate is the total of the equivalent weights of the mono- and poly-compounds.

In general, the procedure by which protective coating films are prepared in accordance with the present invention involves merely adding at ordinary temperatures the Diphenolic Acid and active compound to the isocyanate, forming a film of the desired thickness of the mixture, and converting the mixture by exposure either to air at normal temperature or to heat. In some cases, it is desirable to dilute some or all of the reactants, e.g., in order to lower the viscosity of the mixture and, thus, vary the film thickness of a single coat, and/or in order to dissolve the Diphenolic Acid at room temperature. Any solvent that is inert to both the acid and isocyanate may be used, an example being methyl ethyl ketone among many others. The mixture of reactants, either diluted or not, has been found to be reasonably stable provided it is not heated or exposed to air for excessive periods. Such stability is a feature of considerable importance as it permits large quantities of the mixture to be made up at one time and then used as needed. For heat cure, temperatures of about 80–175° C. for times of about one hour to about five minutes have been found satisfactory. For a room temperature cure, it is preferred that any of the well known conversion catalysts for reactions of this type, such as triethanolamine, be added in small amounts in order to reduce the amount of time needed for the film to harden. When early conversion is of no special advantage, the catalyst may be dispensed with. As the examples show, the characteristics of the cured films vary with the particular combination of reactant and amounts that are employed, with some being better than others, as would ordinarily be expected. As a whole, however, the films possess characteristics that compare favorably with many other available materials so that the product of the invention is quite useful for a variety of purposes. For example, in numerous instances, the films of this invention have withstood boiling water for 16 hours and a 5% caustic solution for more than 90 hours without any indication of failure.

Where solid foam or cellular structures are desired, they may be obtained by mixing the concentrated Diphenolic Acid and active hydrogen compound with a suitable conversion catalyst, of which triethanolamine is again an example, in an appropriate reaction vessel at temperatures at or above the melting point of the acid, adding the isocyanate while agitating, pouring the mixture into a mold, allowing the mixture to foam unimpeded, and converting by heating, as in a draft oven, at a temperature of about 80–175° C. or more for from about 5–30 minutes, or by normal temperatures for much longer periods of time. Although not essential, it is usually desirable to employ an emulsifier in order to obtain a more homogeneous mixture of the reactants. The reaction usually proceeds instantaneously at or above the melting point of the acid. The instant process may be carried out readily in any system which provides for stirring and has sufficient space for the foaming action to proceed unhindered. A modification of a unit currently used in commercial urethane foam production may be employed. Such a system comprises two supply tanks connected to a pressure-mixing nozzle by suitable feed lines. One tank contains the isocyanate and the other tank contains the Diphenolic Acid and active compound emulsified with the emulsifying agent and catalyst. As pure or substantially pure Diphenolic Acid is solid at room temperatures the latter tank must be heated. The acid and isocyanate are fed from the tanks to the nozzle where they are mixed under pressure and flowed into pans where the foaming reaction is allowed to proceed unhindered. Again, the foams may be cured in a suitable draft oven at elevated temperatures, thus accelerating the operation. Although the foams may be cured at ordinary temperatures as in the case of the films, this considerably prolongs the curing time and a heat cure is preferred.

As has already been briefly mentioned, the Diphenolic Acid as well as carboxyl-containing active compounds are especially well suited for the formation of urethane foams by reason of the carboxyl group or groups which they contain. These groups in the course of the reaction decompose to form gaseous carbon dioxide which bubbles through the mixture to produce a cellular structure. Thus, a foaming medium is inherently present, eliminating the need, in many instances, of an external foaming agent, this being especially true where a polybasic acid constitutes the active compound. With other active compounds the use of external foaming agents, such as water, to assist in the foaming action may not be precluded entirely as it sometimes proves advantageous to add small amounts of water, say up to about 5% by weight of the mixture. The use of water merely as an assistant does not add unduly to the curing time of one hour or less which is in distinct contrast to typical present commercial polyurethane foam processes, wherein water is relied upon as the sole or principal foaming agent, which require a post-cure of some 24 hours' duration. The density of the foams made as described herein varies not only with the particular isocyanate selected for reaction but with the temperature of the conversion as well. It has been found that as the temperature of this stage is increased, the density of the foam also increases, due presumably to the increased loss of $CO_2$ from the mixture at the higher temperatures.

The toughness and rigidity contributed by the Diphenolic Acid are especially significant in the case of foam structures made in the past from isocyanate and active hydrogen compound reaction products which have, for the most part, been of rather soft, spongy texture. The toughness and rigidity together with the resistance to water and common chemicals that the present foams exhibit as well as a very low density when compounded to this end, constitute a rather exceptional combination in this field, so that the present invention should be particularly valuable in producing foam structures for such uses as air domes, insulation, crash linings for vehicles, aircraft, etc., and structural components alone or in conjunction with outer coverings of wood or metal.

For the sake of brevity as well as convenience, most of the remainder of this disclosure will be presented in the form of four tables, the first three giving examples of the three reaction components, along with some pertinent information concerning them, and the fourth providing working examples of the invention in the coating field.

It will be observed that an isocyanate equivalent is specified for each acid. The isocyanate equivalent is defined as the weight of the acid which will react with one equivalent of the isocyanate and will be of assistance in selecting actual amounts of the acid that should be used. The method used in determining the observed values as listed involves reacting a sample of the acid with an excess of toluene-2,4-diisocyanate and then determining the excess isocyanate by reaction with di-n-butylamine. Specifically, the technique used is as follows:

To 25 ml. of methyl isobutylketone is added 3 grams of toluene-2,4-diisocyanate previously standardized against di-n-butylamine and a weight of the acid such that the diisocyanate is present in approximately 100% excess. To this mixture is added triethylamine in an amount equal to 1% of the weight of isocyanate and the acid. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed to the boiling point, allowed to stand for one hour at which point 75 ml. of methanol is added, and the excess di-n-butylamine back-titrated with 1 N alcoholic hydrochloric acid.

The acid number given for each acid has its usual meaning, which is the number of milligrams of potassium hydroxide necessary to neutralize the acid content of one gram of the sample, and provides an indication of the degree of acidity of the product.

It will be noted that an observed and theoretical amine equivalent is specified for each isocyanate. The amine equivalent refers to the weight of the isocyanate containing one isocyanate group and reacting with one mole

TABLE I.—REPRESENTATIVE DIPHENOLIC ACID

| No. | Acid | Abbreviation | Isocyanate equivalent (observed) |
|---|---|---|---|
| 1 | Condensation products of levulinic acid and phenol: A mixture consisting of 376 parts of phenol, 116 parts of levulinic acid, and 250 parts of 37% aqueous hydrochloric acid was agitated at 48-52° C. for 66 hours. The upper organic layer was removed from the aqueous HCl for decantation. The product was then purified by vacuum distillation of the volatile unreacted materials by heating to 180° C. at 32 mm. pressure. The residual product amounted to 247 parts (86.5% of theoretical) having a softening point of 80° C. and an acid number of 155. Purification of this product by first dissolving in aqueous bicarbonate solution, reprecipitating with mineral acid, followed by recrystallization from hot water gives a white crystalline compound melting at 171-172° C., having an acid value of 196. | DPA | 89.7 |
| 2 | Condensation product of levulinic acid and meta-cresol: A mixture of 378 parts (3.5 mols) of meta-cresol, 116 parts (1 mol) of levulinic acid, and 250 parts of 37% aqueous hydrochloric acid was agitated at 50° C. for 72 hours. The upper organic layer was removed from the aqueous HCl by decantation. The product was then purified by vacuum distillation of the volatile unreacted materials by heating to 170° C. at 30 mm. pressure. The residual product has an acid number of 166 (theoretical for the pure Diphenolic Acid=178). The yield amounted to 184 parts (58.6% of theoretical). | DCA | 198 |
| 3 | Condensation of levulinic acid and a mixture of phenol and ortho-cresol: Similar treatment of a mixture of 3.5 mols of a technical cresol containing 40 parts phenol and 60 parts ortho-cresol, 1 mol of levulinic acid, and 250 parts of 37% hydrochloric acid gave 275 parts (90.5% of theoretical) of a product having and acid number of 149. | DPCA | 235 |
| 4 | Condensation of levulinic acid and xylenol: Similar treatment of a mixture of 3.5 mols of technical xylenol, a cresylic acid, supplied by the Koppers Company, Inc., under the trade name X-2, which contains 95% xylenols of which about 30% is 3,5-xylenol and has a distillation range at the 5% point of 214-217° C. and at the 95% point of 220-225° C.; 1 mol levulinic acid; and 250 parts of 37% hydrochloric acid reacted at 50° C. for 96 hours gave a product having an acid number of 166 in yields of around 50% of the theoretical amount. | DXA | 168 |

TABLE II.—REPRESENTATIVE ISOCYANATES

| No. | Commercial source, trade name, and abbreviation | Structure | Amine equivalent Observed | Amine equivalent Theory |
|---|---|---|---|---|
| 1 | E. I. du Pont de Nemours & Co., Inc.; Hylene T; Hy T. | Toluene-2,4-diisocyanate | 90.62 | 87.07 |
| 2 | E. I. du Pont de Nemours & Co., Inc.; Hylene M; Hy M. | Methylene bis(4-phenyl isocyanate) | 139.98 | 125.12 |
| 3 | National Aniline Div.; Nacconate 200; N 200 | 3,3'-bitolylene-4,4'-diisocyanate | 132.78 | 132.13 |
| 4 | Mobay Chemical Co.; Mondur N5; MO N5 | Naphthylene-1,5-diisocyanate | 116.58 | 105.09 |
| 5 | Mobay Chemical Co.; Mondur TM; MO TM | Triphenylmethane triisocyanate | 107.78 | 123.45 |
| 6 | Mobay Chemical Co.; Mondur HX; MO HX | OCN (CH$_2$)$_6$NCO  Hexamethylene diisocyanate | 103.39 | 84.01 |
| 7 | Mobay Chemical Co.; Mondur O; MO O | CH$_3$(CH$_2$)$_{17}$NCO  Octadecylisocyanate | 342.32 | 295.0 |
| 8 | Shell Development Co.; Durenediisocyanate; Dur | 2,3,5,6-tetramethyl-1,4-benzene diisocyanate | 111.22 | 108.12 | of di-n-butylamine. Since the isocyanates available commercially are not necessarily chemically pure, the observed values were obtained for use as a guide in formulating reaction products therefrom as these values provide a measure of the actual purity of each compound.

The analytical procedure used to determine amine equivalents of diisocyanates is found in Monsanto Chemical Company's Technical Bulletin #P-125 and is generally as follows:

Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference in weight between the empty and the filled bulb. The bulb was immersed in the Erlenmeyer flask and crushed beneath the surface of the liquid. The solution was heated to boiling and allowed to cool 1 hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled H$_2$O. The average precision demonstrated by these determinations was ±1.29%.

TABLE III.—ACTIVE HYDROGEN COMPOUNDS

A. POLYHYDROXY COMPOUNDS

| Compound | Abbrev. used in tables | Isocyanate equivalent | |
|---|---|---|---|
| | | Observed | Theoretical |
| Ethylene glycol | EG | 27.64 | 31.03 |
| 1,4-butanediol | Budiol | 39.26 | 45.06 |
| Diethylene glycol | DEG | 44.76 | 51.16 |
| Polyethylene glycol 400 (Carbide & Carbon Chemicals Co., described as having M.W. 380–420; viscosity 7.3 centistokes at 210° F.) | PG400 | 163.48 | 190–210 |
| Polyethylene glycol 1000 (Carbide & Carbon Chemicals Co., M.W. 950–1050; viscosity 17.4 centistokes at 210° F.) | PG1000 | 409.76 | 500 |
| Polyethylene glycol 4000 (Carbide & Carbon Chemicals Co., M.W. 3000–3700; viscosity 75–78 centistokes at 210° F.) | PG4000 | 1,651.9 | 1,500–1,850 |
| Polyethylene glycol 6000 (Carbide & Carbon Chemicals Co., M.W. 6000–7500; viscosity 700–900 centistokes at 210° F.) | PG6000 | 3,475.6 | 3,000–3,750 |
| Glycerol (C.P. grade) | G | 29.53 | 30.67 |
| Pentaerythritol | PN | 24.24 | 34.04 |
| Epon 864 [1] (Shell Chemical Corp. An epoxy resin prepared from the condensation of epichlorohydrin with bis(4-hydroxyphenyl)-dimethyl methane in the presence of alkali having a melting point (Durrans' Mercury Method, Journal of Oil & Colour Chemists' Assoc. 12, 173–175 [1929]) of 40–45° C.; epoxide equivalent 300–375.) | Epon 864 | 311.63 | |
| Epon 1007 [1] (Shell Chemical Corp. An epoxy resin prepared from the condensation of epichlorohydrin with bis(4-hydroxyphenyl)-dimethyl methane in the presence of alkali having a melting point (Durrans' Mercury Method) of 127–133° C.; epoxide equivalent 1,550–2,000.) | Epon 1007 | 360.29 | |
| Bis(4-hydroxyphenyl)-dimethyl methane-formaldehyde condensate (In a 3 liter, 3-neck flask provided with a mechanical agitator, a thermometer, and a reflux condenser was placed 912 parts of bis(4-hydroxyphenyl)-dimethyl methane, 960 parts of 37% aqueous formaldehyde and 2.3 parts oxalic acid. With continuous agitation the reaction mixture was heated to reflux temperature and refluxing continued for 1 hr. After permitting the reaction mixture to cool to around 50° C. the water layer was removed by decantation. The phenol-formaldehyde layer was then washed 3 times with water which in each case was removed by decantation. The last portion of water was removed by distillation at reduced pressure using a water aspirator system which gave pressure around 30–40 mm. The flask temp. during the removal of this last portion of water ranged from 70–90° C. The product, amounting to 1,065 parts, was a clear, heavy, syrupy material. The nonvolatile content was 83.4%.) | BDF | 98.78 | |
| p-t-Butylphenol-formaldehyde condensate (The procedure of preparation, including the dehydration step, was the same as that used with bis(4-hydroxyphenyl)-dimethyl methane above. A mixture of 1,000 parts of para-tertiary butylphenol, 1,067 parts of 37% aqueous formaldehyde, and 10 parts of sodium hydroxide was used to give a final yield of 1,470 parts of a clear, almost colorless syrupy product. The nonvolatile content was 93.6%.) | BPF | 156.54 | |
| Resorcinol | R | 105.38 | 55.05 |
| Hydroquinone, C.P. | HQ | 161.44 | 55.05 |
| 1,5-dihydroxynaphthalene | DHN | 217.38 | 80.08 |
| 4,4'-dihydroxybenzophenone | DHB | 221.0 | 107.1 |
| Bis(4-hydroxyphenyl)-dimethyl methane | BDM | 304.22 | 114.0 |

B. POLYBASIC ACIDS

| Compound | Abbrev. | Observed | Theoretical |
|---|---|---|---|
| Azelaic acid | Az | 87.53 | 94.11 |
| Adipic acid | AA | 71.35 | 73.07 |
| Aconitic acid | AcA | 57.28 | 58.03 |
| Fumaric acid | FA | 52.36 | 58.03 |
| Diglycolic acid | DGA | 166.02 | 67.04 |
| Isophthalic acid | IA | 485.29 | 83.06 |

C. POLYAMINES AND POLYAMIDES

| Compound | Abbrev. | Observed | Theoretical |
|---|---|---|---|
| Hexamethylenediamine | Hexa | 31.96 | 29.05 |
| Diethylenetriamine | DET | 17.99 | 20.63 |
| Triethylene tetraamine | TT | 27.50 | 26.38 |
| Phenylene diamine | PD | 41.54 | 27.03 |
| Diethanolamine | DEA | 41.2 | 35.05 |
| Adipamide | ADA | 106.22 | 38.04 |
| Phthalamide | PA | 140.36 | 41.04 |
| Malonamide | MA | 63.65 | 25.52 |
| p-Toluenesulfonamide | TSA | 98.63 | 85.60 |
| Polyamide resin (In a 3-liter, 3-neck flask provided with mechanical agitator, thermometer, and water trap with a reflux condenser above was placed 1,545 parts of Emery Industries, Inc., Dimer Acid #955 (a dimerized soya bean oil acid) and 269 parts of ethylenediamine. The flask was provided with an inlet for an inert gas. With continuous agitation and in an inert atmosphere of nitrogen gas the reaction mixture was heated from 94–220° C. over a period of 12 hours. 165 parts of water were removed from the reaction mixture during this period. The resulting polyamide resin had an acid number of 3.2, and a softening point of 87–89° C. (Durrans' Mercury Method).) | PAR | 380.03 | 312.03 |

D. SULFUR-CONTAINING COMPOUNDS

| Compound | Abbrev. | Observed | Theoretical |
|---|---|---|---|
| Thiomalic acid | TA | 58.20 | 50.03 |
| Thioglycolic acid | TGA | 35.42 | 46.05 |
| Thiourea | TU | 15.34 | 19.03 |
| 2-mercaptoethanol | 2ME | | 39.06 |
| Thiokol Liquid Polymer LP-3 ((Thiokol Chemical Corp.) Described as having formula $HS-(C_2H_4O-CH_2-O-C_2H_4S-S)_6-C_2H_4-O-CH_2-O-C_2H_4-SH$ having viscosity at 25° C. of 700–1,200 centipoises.) | LP3 | 773.03 | |
| Thiokol Liquid Polymer LP-8 ((Thiokol Chemical Corp.) Described as having formula $HS(CH_2CH_2-O-CH_2-O-CH_2CH_2SS)_{3-4}CH_2CH_2-O-CH_2-O-CH_2CH_2SH$ having viscosity at 27° C. of 250–350 centipoises.) | LP8 | 380.68 | |
| Thiokol Liquid Polymer LP-33 ((Thiokol Chemical Corp.) Described as having formula $HS(C_2H_4-O-CH_2-O-C_2H_4S-S)_6-C_2H_4-O-CH_2-O-C_2H_4-SH$ having viscosity at 25° C. at 1,300–1,550 centipoises.) | LP33 | 597.66 | |

[1] Preparation of these epoxide materials as well as illustrative examples are described in U.S. Patents 2,456,408, 2,503,726, 2,615,007, 2,615,008, 2,688,805, 2,688,807, and 2,698,315.

TABLE III.—ACTIVE HYDROGEN COMPOUNDS—Continued

E. POLYESTER RESINS

| Compound | Abbrev. used in tables | Isocyanate equivalent | |
|---|---|---|---|
| | | Observed | Theoretical |
| Polyester resin [2] (A succinic acid, azelaic acid, ethylene glycol, and glycerol polyester.) | PER 1 | 246.1 | |
| Polyester resin [3] (A glycerol, azelaic acid and succinic anhydride polyester.) | PER 2 | 107.4 | |
| Polyester resin [4] (A diethylene glycol, adipic acid and glycerol polyester.) | PER 3 | 929.0 | |
| Polyester resin [5] (A diethylene glycol and adipic acid polyester.) | PER 4 | 480.5 | |
| Polyester resin [6] (A diethylene glycol and phthalic anhydride polyester.) | PER 5 | 1,046 | |

[2] In a 3-neck flask provided with a thermometer, a condenser attached through a water trap, and a mechanical stirrer was placed 502 parts succinic anhydride, 943 parts azelaic acid, and 414 parts ethylene glycol. The reaction mixture was gradually heated to 204° C. with continuous agitation at which point a sufficient amount of xylene was added to give constant refluxing at 195-204° C. After refluxing for 2 hours at 195-204° C., 462 parts of glycerol was added dropwise over a period of 1 hour and 10 minutes. Refluxing was continued for 2 hours and 15 minutes at 204-220° C. at which point most of the xylene was removed by distillation. The viscous syrupy product had a nonvolatile content of 96.5% and an acid value of 6.

[3] As in the preparation of PER 1, 925 parts of glycerol, 785 parts azelaic acid, and 418 parts of succinic anhydride were refluxed with xylene at 184-204° C. for 3½ hours. Most of the xylene was removed by distillation at 200-205° C. The viscous syrupy product had a non-volatile content of 95% and acid value of 7.6.

[4] As in the preparation of PER 1, 212 parts of diethylene glycol, 292 parts of adipic acid, and 2 parts of glycerol were refluxed with xylene at 200-225° C. for 6 hours. The xylene was removed by heating at 220-225° C. with reduced pressure of around 70-80 mm. The viscous syrupy product had an acid value of 12.8.

[5] As in the preparation of PER 1, 212 parts of diethylene glycol and 292 parts of adipic acid were refluxed with xylene at 200-225° C. for 6 hours. The xylene was removed by heating at 200-225° C. with reduced pressure of around 70-80 mm. The viscous syrupy product had an acid value of 87.

[6] As in the preparation of PER 1, 212 parts diethylene glycol and 355 parts of phthalic anhydride were refluxed with xylene at 200-225° C. for 6 hours. The xylene was removed by heating at 220-225° C. with reduced pressure of around 70-80 mm. The viscous syrupy product had an acid value of 60.

The following examples, presented in tabular form to conserve space, illustrate the conversion of mixtures of polybasic acids and polyisocyanates alone and modified with a monoisocyanate to insoluble, infusible products. Each of the resinous acids was dissolved in the designated solvent to a non-volatile content of 40-60%. The isocyanates and modifiers were used in most examples at 100% non-volatile content. In some instances, however, the modifier was dissolved in small amounts of the same solvent for solubility purposes. The mixtures thus obtained were applied to glass panels at 0.002" wet film thickness. The table gives the heat treatment used for conversion and indication of film flexibility and water and alkali resistance in actual applications. All parts are by weight.

TABLE IV.—EXAMPLES OF THE INVENTION AS A COATING

A. POLYHYDROXY COMPOUND

| Ex. No. | Diphenolic acid | Parts | Isocyanate | Parts | Triethylamine, parts | Active compound | Parts | Solvent | Conversion Time (hrs.) | Conversion Temp., ° C. | Film properties | Withstood in hrs. H₂O at 100° C. | Withstood in hrs. 5% aq. NaOH at 25° C. |
|---|---|---|---|---|---|---|---|---|---|---|---|---|---|
| I | DPA | 89.7 | HY T | 181 | | Budiol | 39.3 | MIK | 0.5 | 175 | Flexible | 16+ | 50+ |
| II | DPA | 89.7 | HY T | 181 | | DEG | 44.8 | MIK | 0.5 | 175 | ...do | 16+ | 50+ |
| III | DPA | 89.7 | HY T | 109 | | DG 400 | 32.7 | MIK | 0.5 | 175 | Brittle | 8 | .75 |
| IV | DPA | 89.7 | HY T | 181 | | EG 1 | 27.6 | MIK | 0.5 | 175 | Flexible | 16+ | .25 |
| V | DPA | 89.7 | HY T | 181 | | G 8 | 29.5 | MIK | 0.5 | 175 | Brittle | 16+ | 21 |
| VI | DPA | 134.6 | HY T | 181 | 3.6 | PG 1000 | 204.9 | MIK | 0.5 | 175 | Flexible | 2 | .08 |
| VII | DPA | 89.7 | HY T | 181 | | Epon 864 | 155.8 | MIK | 0.5 | 175 | Brittle | 16+ | 90+ |
| VIII | DPA | 89.7 | HY T | 181 | | BDF | 49.4 | MIK | 0.5 | 175 | ...do | 16+ | .08 |
| IX | DPA | 89.7 | HY T | 181 | | R | 105.4 | MIK | 0.5 | 175 | ...do | 2 | .25 |
| X | DPA | 89.7 | HY T | 181 | | DHB | 221 | MIK | 0.5 | 175 | ...do | 2 | .08 |
| XI | DPA | 44.8 | HY T | 127 | | BDM | 273.8 | MIK | 0.5 | 175 | ...do | 2 | 7 |
| XII | DPA | 89.7 | HY M | 280 | | Budiol | 39.3 | MIK | 0.5 | 175 | Flexible | 16+ | 50+ |
| XIII | DPA | 107.6 | HY M | 280 | | Budiol | 31.4 | MIK | 0.5 | 175 | Brittle | 16+ | 50+ |
| XIV | DPA | 71.8 | HY M | 280 | | DEG | 53.7 | MIK | 0.5 | 175 | Flexible | 16+ | 90+ |
| XV | DPA | 107.6 | HY M | 280 | | PG 400 | 130.8 | MIK | 0.5 | 175 | ...do | 16+ | 90+ |
| XVI | DPA | 71.8 | HY M | 280 | | EG | 33.2 | MIK | 0.5 | 175 | ...do | 16+ | 50+ |
| XVII | DPA | 89.7 | HY M | 280 | | G | 29.5 | MIK | 0.5 | 175 | Brittle | 16+ | 50+ |
| XVIII | DPA | 44.8 | HY M | 154 | | PN | 14.5 | MIK | 0.5 | 175 | ...do | 16+ | 90+ |
| XIX | DPA | 107.6 | HY M | 280 | | Epon 1007 | 144.1 | MIK | 0.5 | 175 | ...do | 16+ | 90+ |
| XX | DPA | 44.8 | HY M | 280 | | HQ | 66.1 | MIK | 0.5 | 175 | Flexible | 16+ | .75 |
| XXI | DPA | 89.7 | HY M | 280 | | BDM | 114 | MIK | 0.5 | 175 | Brittle | 16+ | 90+ |
| XXII | DPA | 89.7 | MO HX | 207 | | Budiol | 39.3 | MIK | 0.5 | 175 | Flexible | 16+ | 50+ |
| XXIII | DPA | 107.6 | MO HX | 155 | | DEG | 13.4 | MIK | 0.5 | 175 | ...do | 12+ | 6 |
| XXIV | DPA | 152.5 | MO HX | 207 | | EG | 8.3 | MIK | 0.5 | 175 | ...do | 16+ | 50+ |
| XXV | DPA | 89.7 | MO HX | 207 | | G | 29.5 | MIK | 0.5 | 175 | ...do | 16+ | 28 |
| XXVI | DPA | 89.7 | MO HX | 207 | | PN | 24.2 | MIK | 0.5 | 175 | ...do | 16+ | 90+ |
| XXVII | DPA | 89.7 | MO HX | 207 | | Epon 864 | 155.8 | MIK | 0.5 | 175 | ...do | 16+ | 90+ |
| XXVIII | DPA | 107.4 | MO HX | 196 | | BDF | 34.5 | MIK | 0.5 | 175 | ...do | 16+ | 7 |
| XXIX | DPA | 53.8 | MO HX | 155 | | R | 49.5 | MIK | 0.5 | 175 | ...do | 16+ | 90+ |
| XXX | DPA | 71.8 | MO HX | 186 | | DHN | 186.1 | MIK | 0.5 | 175 | Brittle | 4 | .08 |
| XXXI | DPA | 89.7 | MO HX | 186 | | BDM | 91.2 | MIK | 0.5 | 175 | Flexible | 8 | 8.5 |
| XXXII | DPA | 89.7 | N 200 | 266 | | Budiol | 39.3 | MIK | 0.5 | 175 | ...do | 16+ | .08 |
| XXXIII | DPA | 89.7 | N 200 | 266 | | DEG | 44.8 | MIK | 0.5 | 175 | Brittle | 16+ | .25 |
| XXXIV | DPA | 161.5 | N 200 | 266 | | PG 4000 | 32.7 | MIK | 0.5 | 175 | ...do | 16+ | .75 |
| XXXV | DPA | 44.8 | N 200 | 266 | | EG | 41.5 | MIK | 0.5 | 175 | ...do | 16+ | .25 |

TABLE IV.—EXAMPLES OF THE INVENTION AS A COATING—Continued

A. POLYHYDROXY COMPOUND—Continued

| Ex. No. | Diphenolic acid | Parts | Isocyanate | Parts | Triethylamine, parts | Active compound | Parts | Solvent | Conversion Time (hrs.) | Conversion Temp., °C | Film properties | Withstood in hrs. H₂O at 100° C. | Withstood in hrs. 5% aq. NaOH at 25° C. |
|---|---|---|---|---|---|---|---|---|---|---|---|---|---|
| XXXVI | DPA | 71.8 | N 200 | 266 | | G | 35.4 | MIK | 0.5 | 175 | Brittle | 16+ | 5 |
| XXXVII | DPA | 17.9 | MO TM | 129 | | DEG | 44.8 | MIK | 0.5 | 175 | do | 16+ | 90+ |
| XXXVIII | DPA | 89.7 | MO N5 | 233 | | Budiol | 39.3 | MIK | 0.5 | 175 | do | 7.5 | .08 |
| XXXIX | DPA | 71.8 | MO N5 | 233 | | EG | 33.6 | MIK | 0.5 | 175 | do | 6.0 | .08 |
| XL | DPA | 98.7 | MO N5 | 187 | | BPF | 46.9 | MIK | 0.5 | 175 | do | 2.5 | .08 |
| XLI | DPA | 89.7 | Dur | 224 | | Budiol | 39.3 | MIK | 0.5 | 175 | do | 7.5 | .08 |
| XLII | DPA | 89.7 | Dur | 378 | | Epon 864 | 233.7 | MIK | 0.5 | 175 | Flexible | 8 | 90+ |
| XLIII | DXA | 84 | HY T | 91 | | Budiol | 19.6 | MIK | 0.5 | 175 | Brittle | 8 | 50+ |
| XLIV | DXA | 84 | HY T | 54 | | Epon 1007 | 36.0 | MIK | 0.5 | 175 | do | 16+ | 50+ |
| XLV | DPCA | 248.6 | HY T | 100 | | EG | 1.4 | MIK | 0.5 | 175 | do | 3 | .08 |
| XLVI | DCA | 99.1 | HY T | 73 | | HQ | 16.5 | MIK | 0.5 | 175 | do | .5 | 2.5 |
| XLVII | DXA | 84 | HY M | 84 | | DHN | 21.7 | MIK | 0.5 | 175 | do | 16+ | 1.5 |
| XLVIII | DXA | 84 | HY M | 126 | | DEG | 17.9 | MIK | 0.5 | 175 | do | 16+ | 72+ |
| XLIX | DPCA | 117.9 | HY M | 84 | | PG 4000 | 165.2 | MIK | 0.5 | 175 | Flexible | 16+ | .08 |
| L | DPCA | 117.9 | HY M | 154 | | R | 33.0 | MIK | 0.5 | 175 | Brittle | 16+ | 72+ |
| LI | DCA | 99.1 | N 200 | 93 | | DEG | 8.9 | MIK | 0.5 | 175 | do | .08 | .08 |
| LII | DPCA | 117.9 | MO TM | 75 | | Epon 864 | 62.3 | MIK | 0.5 | 175 | do | 16+ | 72+ |

B. POLYBASIC ACIDS

| Ex. No. | Diphenolic acid | Parts | Isocyanate | Parts | Triethylamine, parts | Active compound | Parts | Solvent | Time (hrs.) | Temp., °C | Film properties | H₂O at 100° C. | 5% aq. NaOH at 25° C. |
|---|---|---|---|---|---|---|---|---|---|---|---|---|---|
| LIII | DPA | 89.7 | HY T | 181 | 3.6 | Az | 87.5 | MIK | 0.5 | 175 | Brittle | .5 | 25.5 |
| LIV | DPA | 44.9 | HY T | 136 | 5.4 | AA | 71.4 | MIK | 0.5 | 175 | Flexible | 16+ | 50+ |
| LV | DPA | 89.7 | HY T | 181 | 1.8 | AcA | 57.3 | MIK | 0.5 | 175 | Brittle | 4.5 | .25 |
| LVI | DPA | 170.4 | HY T | 181 | 3.6 | FA | 2.6 | MIK | 0.5 | 175 | do | 16+ | 5 |
| LVII | DPA | 89.7 | HY T | 181 | 7.2 | IA | 83.1 | MIK | 0.5 | 175 | Flexible | .25 | 22.5 |
| LVIII | DPA | 44.9 | HY M | 280 | | Az | 43.8 | MIK | 0.5 | 175 | Brittle | 16+ | 50+ |
| LIX | DPA | 44.9 | HY M | 280 | 5.4 | Az | 131.3 | MIK | 0.5 | 175 | Flexible | 16+ | 50+ |
| LX | DPA | 89.7 | HY M | 280 | 5.4 | AA | 71.4 | MIK | 0.5 | 175 | do | 16+ | 50+ |
| LXI | DPA | 107.6 | HY M | 280 | 5.4 | AA | 57.1 | MIK | 0.5 | 175 | Brittle | 16+ | 50+ |
| LXII | DPA | 98.7 | HY M | 280 | 1.8 | AcA | 51.6 | MIK | 0.5 | 175 | do | 16+ | 50+ |
| LXIII | DPA | 174.9 | HY M | 280 | 3.6 | FA | 2.6 | MIK | 0.5 | 175 | do | 16+ | 50+ |
| LXIV | DPA | 89.7 | HY M | 280 | 5.4 | DGA | 83.1 | MIK | 0.5 | 175 | do | 16+ | 96+ |
| LXV | DPA | 89.7 | MO HX | 146 | 3.6 | Az | 8.7 | MIK | 0.5 | 175 | do | 16+ | 50+ |
| LXVI | DPA | 116.6 | MO HX | 266 | 5.4 | AA | 49.9 | MIK | 0.5 | 175 | Flexible | 16+ | 50+ |
| LXVII | DPA | 89.7 | MO HX | 207 | 5.4 | FA | 52.4 | MIK | 0.5 | 175 | do | 8 | 2.5 |
| LXVIII | DPA | 134.6 | MO HX | 207 | 5.4 | DGA | 41.5 | MIK | 0.5 | 175 | do | 16+ | .08 |
| LXIX | DPA | 89.7 | N 200 | 173 | 3.6 | Az | 26.3 | MIK | 0.5 | 175 | Brittle | 8 | .08 |
| LXX | DPA | 44.9 | N 200 | 199 | | Az | 87.5 | MIK | 0.5 | 175 | do | 15 | .25 |
| LXXI | DPA | 9.0 | MO TM | 189 | 1.8 | Az | 87.5 | MIK | 0.5 | 175 | do | .25 | .08 |
| LXXII | DPA | 89.7 | MO N5 | 233 | 1.8 | Az | 87.5 | MIK | 0.5 | 175 | do | .25 | .08 |
| LXXIII | DPA | 89.7 | Dur | 167 | 5.4 | Az | 43.8 | MIK | 0.5 | 175 | do | .25 | .08 |
| LXXIV | DPA | 80.7 | Dur | 166 | 7.2 | FA | 26.2 | MIK | 0.5 | 175 | do | 2 | .08 |
| LXXV | DXA | 84 | HY T | 54 | | AcA | 5.7 | MIK | 0.5 | 175 | do | 2 | .08 |
| LXXVI | DPCA | 117.8 | HY T | 73 | 5.4 | IA | 24.9 | 50:50 MIK/Dioxane | 0.5 | 175 | do | 1.5 | .08 |
| LXXVII | DCA | 99.1 | HY T | 91 | 5.4 | AA | 35.7 | 50:50 MIK/Dioxane | 0.5 | 175 | do | 1.5 | 6 |
| LXXVIII | DXA | 84 | HY M | 126 | | Az | 35.0 | 50:50 MIK/Dioxane | 0.5 | 175 | do | 5 | 1.5 |
| LXXIX | DCA | 99.1 | HY M | 84 | | AcA | 5.7 | 50:50 MIK/Dioxane | 0.5 | 175 | do | 16 | 50+ |
| LXXX | DXA | 84 | MO HX | 83 | 5.4 | AA | 21.4 | 50:50 MIK/Dioxane | 0.5 | 175 | do | 6+ | 50+ |
| LXXXI | DCA | 99.1 | MO HX | 83 | 9.0 | IA | 24.9 | 50:50 MIK/Dioxane | 0.5 | 175 | Flexible | 5+ | .25 |
| LXXXII | DPCA | 117.8 | MO TM | 65 | 5.4 | AA | 7.1 | 50:50 MIK/Dioxane | 0.5 | 175 | Brittle | 10 | 6 |

C. POLYAMINE AND POLYAMIDE

| Ex. No. | Diphenolic acid | Parts | Isocyanate | Parts | Triethylamine, parts | Active compound | Parts | Solvent | Time (hrs.) | Temp., °C | Film properties | H₂O at 100° C. | 5% aq. NaOH at 25° C. |
|---|---|---|---|---|---|---|---|---|---|---|---|---|---|
| LXXXIII | DPA | 134.5 | HY T | 181 | | DET | 9.0 | 50:50 MIK/DMSO | 0.5 | 175 | Brittle | 16+ | 12 |
| LXXXIV | DPA | 89.7 | HY T | 100 | | DET | 2.1 | 50:50 MIK/DMSO | 0.5 | 175 | do | 4 | 1.5 |
| LXXXV | DPA | 89.7 | HY T | 118 | | TT | 8.3 | 50:50 MIK/DMSO | 0.5 | 175 | do | 16+ | 31 |
| LXXXVI | DPA | 89.7 | HY T | 181 | | PD | 27 | 50:50 MIK/DMSO | 0.5 | 175 | do | .25 | .08 |
| LXXXVII | DPA | 89.7 | HY T | 100 | | Hexa | 3.2 | 50:50 MIK/DMSO | 0.5 | 175 | do | .25 | 4 |
| LXXXVIII | DPA | 89.7 | HY T | 181 | | TSA | 98.6 | 50:50 MIK/DMSO | 0.5 | 175 | do | .25 | 4 |
| LXXXIX | DPA | 98.7 | HY T | 136 | | PAR | 190 | 50:50 MIK/DMSO | 0.5 | 175 | do | 1.5 | 1.5 |
| XC | DPA | 98.6 | HY M | 196 | | DET | 5.4 | 50:50 MIK/DMSO | 0.5 | 175 | Flexible | 14 | 95+ |
| XCI | DPA | 89.7 | HY M | 196 | | PD | 10.8 | 50:50 MIK/DMSO | 0.5 | 175 | Brittle | 16+ | 95+ |
| XCII | DPA | 89.7 | HY M | 168 | | Hexa | 6.4 | 50:50 MIK/DMSO | 0.5 | 175 | do | 16+ | 95+ |
| XCIII | DPA | 125.6 | HY M | 224 | | MA | 12.7 | 50:50 MIK/DMSO | 0.5 | 175 | Flexible | 16+ | 95+ |
| XCIV | DPA | 89.7 | HY M | 168 | | PA | 8.2 | 50:50 MIK/DMSO | 0.5 | 175 | Brittle | 16+ | 95+ |
| XCV | DPA | 44.8 | HY M | 210 | | PAR | 380 | 50:50 MIK/DMSO | 0.5 | 175 | do | 16+ | 4 |
| XCVI | DPA | 116.6 | MO HX | 207 | | DET | 12.6 | 50:50 MIK/DMSO | 0.5 | 175 | Flexible | 16+ | 95+ |
| XCVII | DPA | 89.7 | MO HX | 207 | | TT | 10.6 | 50:50 MIK/DMSO | 0.5 | 175 | Flexible | 16+ | 95+ |
| XCVIII | DPA | 89.7 | MO HX | 145 | 9.0 | PD | 12.5 | 50:50 MIK/DMSO | 0.5 | 175 | do | 16+ | 95+ |
| XCIX | DPA | 89.7 | MO HX | 134 | | Hexa | 16.0 | 50:50 MIK/DMSO | 0.5 | 175 | do | 16+ | 4+ |
| C | DPA | 134.5 | MO HX | 155 | | MA | 2.6 | 50:50 MIK/DMSO | 0.5 | 175 | do | 16+ | 21+ |
| CI | DPA | 125.6 | MO HX | 165 | 9.0 | PA | 24.6 | 50:50 MIK/DMSO | 0.5 | 175 | do | 16+ | 4 |
| CII | DPA | 134.6 | MO HX | 207 | 9.0 | TSA | 48.3 | 50:50 MIK/DMSO | 0.5 | 175 | do | 14 | 50+ |
| CIII | DPA | 89.7 | N 200 | 173 | | DET | 5.4 | 50:50 MIK/DMSO | 0.5 | 175 | do | 16+ | 50+ |
| CIV | DPA | 107.6 | N 200 | 186 | | ADA | 7.6 | 50:50 MIK/DMSO | 0.5 | 175 | Brittle | 16+ | .08 |
| CV | DPA | 89.7 | N 200 | 186 | 9.0 | PA | 56.1 | 50:50 MIK/DMSO | 0.5 | 175 | do | .25 | .08 |
| CVI | DPA | 89.7 | MO TM | 119 | | PD | 2.7 | 50:50 MIK/DMSO | 0.5 | 175 | do | 16 | .50 |
| CVII | DPA | 89.7 | MO TM | 162 | | ADA | 19 | 50:50 MIK/DMSO | 0.5 | 175 | do | 16+ | 24 |
| CVIII | DPA | 44.8 | MO TM | 108 | 9.0 | MA | 31.8 | 50:50 MIK/DMSO | 0.5 | 175 | do | 16+ | 21 |
| CIX | DPA | 134.5 | MO N5 | 233 | 3.6 | ADA | 53.1 | 50:50 MIK/DMSO | 0.5 | 175 | do | 9 | 95+ |
| CX | DPA | 89.7 | Dur | 167 | | PAR | 190 | 50:50 MIK/DMSO | 0.5 | 175 | do | 1.5 | .08 |
| CXI | DXA | 168 | HY T | 136 | | ADA | 19 | Dioxane | 0.5 | 175 | do | 5.5 | .08 |
| CXII | DCA | 198.3 | HY T | 181 | | PA | 41 | MIK | 0.5 | 175 | do | .17 | .08 |
| CXIII | DCA | 198.3 | MO HX | 134 | | PD | 12.5 | 50:50 DMSO/Dioxane | 0.5 | 175 | do | 16+ | 2.5 |
| CXIV | DPCA | 157.2 | MO HX | 207 | | TT | 13.7 | 50:50 DMSO/Dioxane | 0.5 | 175 | Flexible | 16+ | 40+ |
| CXV | DPCA | 188.6 | N 200 | 212 | | MA | 20.4 | MIK | 0.5 | 175 | Brittle | 1 | .08 |
| CXVI | DPCA | 23.6 | MO N5 | 128 | | PAR | 31.2 | Dioxane | 0.5 | 175 | do | 8 | 12 |
| CXVII | DXA | 168 | Dur | 222 | | TSA | 85.6 | MIK | 0.5 | 175 | do | .5 | .5 |
| CXVIII | DPA | 44.8 | HY T | 91 | | DEA | 20.6 | MIK | 0.5 | 175 | do | 16+ | .08 |
| CXIX | DXA | 84 | HY T | 118 | | DEA | 33.0 | Dioxane/DMSO | 0.5 | 175 | do | .08 | .25 |
| CXX | DXA | 99.2 | Dur | 78 | | DEA | 8.2 | Dioxane/MIK | 0.5 | 175 | do | .75 | 26.5 |

TABLE IV.—EXAMPLE OF THE INVENTION AS A COATING—Continued

D. SULFUR-CONTAINING COMPOUNDS

| Ex. No. | Diphenolic acid | Parts | Isocyanate | Parts | Triethylamine, parts | Active compound | Parts | Solvent | Conversion Time (hrs.) | Conversion Temp., °C. | Film properties | Withstood in hrs. H₂O at 100° C. | Withstood in hrs. 5% aq. NaOH at 25° C. |
|---|---|---|---|---|---|---|---|---|---|---|---|---|---|
| CXXI | DPA | 17.9 | HY T | 82 | 5.4 | TA | 40.6 | MIK/DMSO | 0.5 | 175 | Brittle | .08 | .08 |
| CXXII | DPA | 9.0 | HY T | 72 | 5.4 | LP3 | 418 | MIK | 1.0 | 200 | Flexible | .08 | .08 |
| CXXIII | DPA | 44.9 | HY M | 140 | | TGA | 17 | MIK/DMSO | 0.5 | 175 | Brittle | 16+ | 96+ |
| CXXIV | DPA | 9.0 | HY M | 70 | | TU | 3.6 | MIK/DMSO | 0.5 | 175 | Flexible | 16+ | 96+ |
| CXXV | DPA | 44.9 | MO HX | 62 | | TU | 1.5 | MIK/DMSO | 0.5 | 175 | do | 4 | .08 |
| CXXVI | DPA | 179.4 | HY T | 362 | | 2ME | 78.1 | MIK | 0.5 | 175 | Brittle | 16+ | 1 |
| CXXVII | DPCA | 259.4 | HY T | 109 | | TU | 1.9 | Dioxane/DMSO | 0.5 | 175 | do | .75 | .08 |
| CXXVIII | DXA | 84 | HY M | 98 | | LP8 | 76.1 | Dioxane/MIK | 0.5 | 175 | Flexible | 16+ | 1 |
| CXXIX | DPCA | 165.1 | MO HX | 83 | 5.4 | LP33 | 59.8 | Dioxane/MIK | 1.0 | 200 | Brittle | 2.5 | .25 |
| CXXX | DCA | 99.2 | MO TM | 65 | | TU | 1.5 | Dioxane | 0.5 | 175 | do | 16+ | 3 |
| CXXXI | DCA | 99.2 | N 200 | 106 | 7.2 | LP8 | 114.2 | Dioxane/MIK | 0.5 | 200 | Flexible | .08 | 1 |

E. POLYESTER RESINS

| Ex. No. | Diphenolic acid | Parts | Isocyanate | Parts | Triethylamine, parts | Active compound | Parts | Solvent | Time (hrs.) | Temp., °C. | Film properties | H₂O at 100° C. | 5% aq. NaOH at 25° C. |
|---|---|---|---|---|---|---|---|---|---|---|---|---|---|
| CXXXII | DPA | 27 | HY T | 54 | | PER 1 | 73 | MIK | 0.5 | 175 | Flexible | 15+ | 32 |
| CXXXIII | DPA | 81 | HY T | 109 | | PER 1 | 73 | MIK | 0.5 | 175 | do | 15+ | 2 |
| CXXXIV | DPA | 108 | HY T | 136 | | PER 1 | 73 | MIK | 0.5 | 175 | do | 15+ | 2 |
| CXXXV | DPA | 135 | HY T | 163 | | PER 1 | 73 | MIK | 0.5 | 175 | do | 15+ | .08 |
| CXXXVI | DPA | 188 | HY T | 217 | | PER 1 | 73 | MIK | 0.5 | 175 | Brittle | 15+ | .75 |
| CXXXVII | DPA | 27 | HY T | 82 | | PER 1 | 146 | MIK | 0.5 | 175 | Flexible | 15+ | 80+ |
| CXXXVIII | DPA | 27 | HY T | 109 | | PER 1 | 219 | MIK | 0.5 | 175 | do | 15+ | 80+ |
| CXXXIX | DPA | 104 | HY T | 109 | 1.80 | PER 3 | 48 | MIK | 0.5 | 175 | Brittle | 2 | .016 |
| CXL | DPA | 166 | HY T | 172 | 1.80 | PER 3 | 48 | MIK | 0.5 | 175 | Brittle | 16+ | .25 |
| CXLI | DPA | 113 | HY T | 118 | 1.80 | PER 3 | 48 | MIK | 0.5 | 175 | Flexible | 1 | .02 |
| CXLII | DPA | 80 | HY T | 97 | 3.60 | PER 4 | 73 | MIK | 0.5 | 175 | do | .08 | 7 |
| CXLIII | DPA | 161 | HY T | 177 | 3.60 | PER 4 | 43 | MIK | 0.5 | 175 | do | 3 | 5 |
| CXLIV | DPA | 22 | HY T | 91 | | PER 2 | 93 | MIK | 0.5 | 175 | Brittle | 16+ | 32+ |
| CXLV | DPA | 22 | HY T | 45 | | PER 2 | 31 | MIK | 0.5 | 175 | Flexible | 16+ | 23 |
| CXLVI | DPA | 27 | HY M | 168 | | PER 1 | 219 | MIK | 0.5 | 175 | do | 23+ | 55+ |
| CXLVII | DPA | 27 | N 200 | 120 | | PER 1 | 146 | MIK | 0.5 | 175 | do | 23+ | 55+ |
| CXLVIII | DPA | 54 | MO TM | 485 | | PER 1 | 73 | MIK | 0.5 | 175 | Brittle | 15+ | 8 |
| CXLIX | DPA | 9 | N 200 | 27 | | PER 3 | 98 | MIK | 0.5 | 175 | Flexible | 12 | 6.5 |
| CL | DPA | 99 | HY M | 168 | | PER 3 | 98 | MIK | 0.5 | 175 | Brittle | 23+ | 55+ |
| CLI | DPA | 13 | N 200 | 40 | 1.80 | PER 4 | 73 | MIK | 0.5 | 175 | Flexible | .08 | .08 |
| CLII | DPA | 161 | MO HX | 202 | 1.80 | PER 4 | 73 | MIK | 0.5 | 175 | do | 23+ | .08 |
| CLIII | DPA | 27 | MO TM | 188 | 1.80 | PER 5 | 52 | MIK | 0.5 | 175 | Brittle | 23+ | 8 |
| CLIV | DPA | 45 | N 200 | 133 | | PER 2 | 62 | MIK | 0.5 | 175 | do | 23+ | 8 |
| CLV | DPA | 23 | MO HX | 78 | | PER 2 | 62 | MIK | 0.5 | 175 | Flexible | 23+ | 8 |
| CLVI | DXA | 25 | HY T | 27 | | PER 1 | 37 | Dioxane | 0.5 | 175 | do | 16+ | 120+ |
| CLVII | DXA | 92 | MO TM | 373 | | PER 3 | 47 | Dioxane | 0.5 | 175 | Brittle | 16+ | 120+ |
| CLVIII | DXA | 84 | MO HX | 78 | | PER 2 | 31 | Dioxane | 0.5 | 175 | Flexible | 24+ | 1 |
| CLIX | DPCA | 34 | HY M | 84 | | PER 1 | 37 | Dioxane | 0.5 | 175 | do | 16+ | 120+ |
| CLX | DPCA | 106 | MO N 5 | 58 | 1.80 | PER 4 | 24 | Dioxane | 0.5 | 175 | Brittle | 1 | 25 |
| CLXI | DPCA | 95 | HY M | 63 | | PER 5 | 52 | Dioxane | 0.5 | 175 | do | 16+ | 48+ |
| CLXII | DCA | 247 | HY M | 182 | | PER 3 | 47 | Dioxane | 0.5 | 175 | do | 8 | .08 |
| CLXIII | DCA | 50 | N 200 | 31 | | PER 2 | 31 | Dioxane | 0.5 | 175 | do | 16+ | 120+ |
| CLXIV | DCA | 50 | HY M | 105 | | PER 2 | 62 | Dioxane | 0.5 | 175 | Flexible | 16+ | 120+ |

It will be understood that the description of flexibility is purely relative and indicates merely whether or not a substantial part of the film could be peeled or stripped intact from the panel. Varying degrees of flexibility or brittleness are encompassed by the general descriptive terms used. Products which might be too brittle for use on film wherein considerable flexibility was a requisite would nevertheless be useful in films where flexibility is of no importance or in cast or molded articles.

In order to demonstrate the preparation of a foam resin structure in accordance with the invention, the following examples were prepared:

Example CLXV 44.9 parts DPA, 15 parts water, 27 parts of polyoxyethylene sorbitan mono-oleate, an emulsifier sold under the trade-name "Tween 80" by Atlas Powder Company, and 1.8 parts of triethylamine were stirred with 369 parts of the polyester resin that is designated PER 1 in Table 3 in an open container until a homogeneous mixture was obtained. 299 parts of toluene-2,4-diisocyanate were added, with continuous stirring, and the mixture allowed to foam freely. The temperature of the mixture was maintained at 25° C. until the product had solidified. The result was a rigid foam which was relatively unbrittle.

Example CLXVI

Example CLXV was repeated, employing 22.5 parts DPA, 14 parts water, 25 parts "Tween 80," 1.8 parts triethylamine, 369 parts of polyester resin PER 1, and 272 parts toluene 2,4-diisocyanate. The conversion was also carried out at 25° C. The product was similar to that of Example CLXV in that the foam was rigid but relatively unbrittle.

Example CLXVII

Example CLXV was repeated, except that 181 parts of toluene 2,4-diisocyanate, 9 parts of water, and 464 parts of the polyester resin designated PER 3 in Table 3 were employed. Again, the mixture was converted at 25° C. The foam that was produced was flexible with relatively low rigidity.

In the preceding three examples relating to foam products, the polyester resin was at liquid at ordinary temperature and was mixed with the DPA by melting the latter and stirring. After cooling to room temperatures, the mixture remained sufficiently fluid to be easily mixed with the isocyanate. Where the mixture of DPA and active hydrogen compound is not sufficiently fluid at room temperature, it may be heated to its melting point and the reaction allowed to proceed upon the addition of the isocyanate. It is preferred that the foaming be allowed to take place at the lowest possible temperature consistent with proper mixing since high temperatures appear to promote non-uniform cell structure.

The aforegoing examples are furnished only for the guidance of those seeking to practice the invention and not for the purpose of defining the boundaries within which it is operative. Numerous other embodiments

Having thus described the invention, that which is claimed is:

1. A composition of matter comprising the polymeric reaction product of (A) a compound of the general formula $R(NCX)_z$, wherein R is an organic radical having a valency equal to $z$, X is a chalcogen having an atomic weight of less than 33 and $z$ is an integer having a value of more than 1, (B) a compound containing at least two active hydrogen atoms, each of said active hydrogen atoms being present in a compound selected from the group consisting of polyesters, polyhydric alcohols, polyhydric phenols in which the active hydrogen appears in functional groups consisting of hydroxyl groups, polyamines, polyamides, polycarboxylic acids, water, mixtures thereof and any of the above compounds in which at least one oxygen atom has been replaced by sulfur and (C) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, wherein the reactive functional groups of (A) and (B)+(C) are present in an equivalent ratio of from about 5:1 to 1:5 with (B) constituting from 5–65% by weight of (B)+(C).

2. The composition of matter of claim 1 wherein the pentanoic acid of (C) consists essentially of 4,4 bis(4-hydroxyaryl)pentanoic acid wherein the hydroxyaryl radical is a hydroxyphenyl radical and is free from substituents other than alkyl groups of one carbon atom.

3. The composition of matter of claim 1 wherein the pentanoic acid of (C) is 4,4 bis(4-hydroxyphenyl)pentanoic acid.

4. The composition of matter of claim 3 wherein the reactive functional groups of (A) and (B)+(C) are present on an equivalent ratio of from about 2:1 to 1:2 with (B) constituting from 5–65% by weight of (B)+(C).

5. The composition of matter as described in claim 4 wherein R of (A) is an organic aromatic radical.

6. The composition of matter as described in claim 4 wherein R of (A) is an organic aliphatic radical.

7. A method of preparing a new polymeric composition of matter which comprises admixing (A) a compound of the general formula $R(NCX)_z$, wherein R is an organic radical having a valency equal to $z$, X is a chalcogen having an atomic weight of less than 33 and $z$ is an integer having a value of more than 1, (B) an organic compound containing at least two active hydrogen atoms, each of said active hydrogen atoms being present in a compound selected from the group consisting of polyesters, polyhydric alcohols in which the active hydrogen appears in functional groups consisting of hydroxyl groups, polyhydric phenols, polyamines, polyamides, polycarboxylic acids, water mixtures thereof and any of the above compounds in which at least one oxygen atom has been replaced by sulfur and (C) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, wherein the reactive functional groups of (A) and (B)+(C) are present on an equivalent ratio of from about 5:1 to 1:5, with (B) constituting from 5–65% by weight of (B)+(C), and heat converting said mixture to an insoluble, infusible resin.

References Cited in the file of this patent

FOREIGN PATENTS 901,768    France _____ Nov. 13, 1944

OTHER REFERENCES

Bader et al.: "J.A.C.S.," vol. 76, pages 4,465–4,466 (September 5, 1954.) (Copy in Scientific Library.)

UNITED STATES PATENT OFFICE
CERTIFICATE OF CORRECTION

Patent No. 2,907,745                                       October 6, 1959

Sylvan O. Greenlee

It is hereby certified that error appears in the printed specification of the above numbered patent requiring correction and that the said Letters Patent should read as corrected below.

Column 4, line 21, for "that" read -- than --; column 10, TABLE I, second column thereof, last line of Example No. 3, for "and" read -- an --; columns 11 and 12, TABLE II, third column thereof, the formula opposite Example No. 2 should appear as shown below instead of as in the patent:

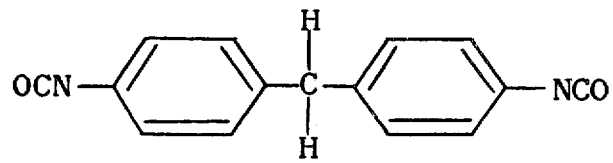

columns 15 and 16, 17 and 18, and 19 and 20, TABLE IV, second column thereof, for the heading "Diphenolic acid" read -- Diphenolic Acid --; same columns 15 to 20, TABLE IV, last column thereof, in the sub-heading, for "NaCH" read -- NaOH --; columns 17 and 18, TABLE IV-C., third column thereof, and opposite "Ex. No. LXXXIX", for "98.7" read -- 89.7 --; columns 19 and 20, TABLE IV-D., first column thereof, for Ex. No. "CXXXIX" read -- CXXIX --; same columns 19 and 20, TABLE IV-E., eighth column thereof and opposite "Ex. No. CXLIII", for "43" read -- 73 --; column 22, line 16, strike out ", polyhydric phenols" and insert the same after "alcohols" in line 14, same column 22.

Signed and sealed this 8th day of November 1960.

(SEAL)
Attest:

KARL H. AXLINE                                         ROBERT C. WATSON
Attesting Officer                                      Commissioner of Patents